US006801127B2

(12) United States Patent
Mizusawa et al.

(10) Patent No.: US 6,801,127 B2
(45) Date of Patent: Oct. 5, 2004

(54) DRIVING ASSISTANCE DISPLAY APPARATUS

(75) Inventors: Kazufumi Mizusawa, Kawasaki (JP); Masamichi Nakagawa, Hirakata (JP); Shusaku Okamoto, Hirakata (JP); Atsushi Iisaka, Katano (JP); Takashi Yoshida, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 107 days.

(21) Appl. No.: 10/215,439

(22) Filed: Aug. 9, 2002

(65) Prior Publication Data

US 2003/0035050 A1 Feb. 20, 2003

(30) Foreign Application Priority Data

Aug. 9, 2001 (JP) .................................... P. 2001-242410

(51) Int. Cl.[7] ................................................ B60Q 1/00
(52) U.S. Cl. .................... 340/461; 340/995.15; 352/60; 352/61
(58) Field of Search ......................... 340/461, 901–904, 340/995.15; 352/60–63; 381/365; 342/177

(56) References Cited

U.S. PATENT DOCUMENTS 5,289,321 A * 2/1994 Secor ......................... 359/896
5,670,935 A * 9/1997 Schofield et al. ........... 340/461
5,949,331 A 9/1999 Schofield et al. ........... 340/461
6,411,874 B2 * 6/2002 Morgan et al. ............... 701/36

FOREIGN PATENT DOCUMENTS

| EP | 0 714 043 A1 | 5/1996 | |
| JP | 11-338074 | 12/1999 | ........... G03B/37/00 |
| WO | WO 00/08889 | 2/2000 | |
| WO | WO 00/60857 | 10/2000 | |
| WO | WO 00/64175 | 10/2000 | ........... G03B/15/00 |

OTHER PUBLICATIONS

Patent Abstracts of Japan, "Surrounding Monitoring Device for Vehicle", Publication No. 11338074, Publication Date: Dec. 10, 1999, 1 page.
Patent Abstracts of Japan, "Surrounding Monitoring Device for Vehicle", Publication No. 11338074, Publication Date: Dec. 10, 1999, 1 page.

* cited by examiner

Primary Examiner—Jeffery Hofsass
Assistant Examiner—Jennifer Stone
(74) Attorney, Agent, or Firm—Pearne & Gordon LLP

(57) ABSTRACT

In correspondence with each face of a rectangular parallelepiped obtained when the inside of the rectangular parallelepiped is shot, a monitor screen is split into a plurality of sub-screen areas. An image shot by a vehicle-mounted camera is processed and the processed image is split correspondingly to the sub-screen areas. Each split image is displayed in the corresponding sub-screen areas. This allows intuitive understanding of the direction of an image displayed in a sub-screen thereby providing the driver with an image free from a sense of incongruity.

7 Claims, 7 Drawing Sheets

DRIVING ASSISTANCE DISPLAY APPARATUS

BACKGROUND OF THE INVENTION

The present invention relates to driving assistance display apparatus for displaying, on the screen, an image around a vehicle shot by a vehicle-mounted camera, and in particular to driving assistance display apparatus preferable for three-dimensionally making recognizable an image around a vehicle on a two-dimensional screen.

A rearview system for presenting an image from a wide angle camera mounted at the rear of a vehicle to a driver without correction is common as apparatus for presenting an image from a vehicle-mounted camera to a driver to assist driving. The rearview system mainly aims at assisting safety check required in backing a vehicle and parking.

FIG. 18 explains a conventional rearview system. This rearview system includes an a wide angle camera 2 mounted at the rear of a vehicle 1 and shooting the rear of the vehicle, image synthesis/conversion unit 3 for synthesizing images from the wide angle camera 2 and applying viewpoint conversion on the resulting image, and a monitor 4 for displaying an image generated by the image synthesis/conversion unit 3.

The wide angle camera 2 is mounted to shoot the rear of the vehicle 1. An image acquired by the wide angle camera 2 has undergone processing to remove lens distortion by the image synthesis/conversion unit 3 and is converted to an image as if shot from an arbitrary virtual view point and displayed on the monitor 4. The driver can check safety at the rear of the vehicle by using this image.

While a single wide angle camera 2 is shown in FIG. 18, it is possible to substitute a plurality of cameras for a wide angle camera. For example, as the system shown in the U.S. Pat. No. 5,649,331, incase images from a plurality of cameras are synthesized into a single screen, individual cameras need not necessarily wide angle cameras but a wide angle image is displayed on the monitor 4.

Apart from this, according to a conventional technology described in the Japanese Patent Publication No. 1999-338078, when a camera image from right and left camera is displayed on a blind corner monitor, the right/left screen, a monitor screen 5 as shown in FIG. 17, into two sub-screens 5a, 5b. The driver uses the images shown on the two sub-screens 5a, 5b to check the situation on the right and left sides on the vehicle as blind spots.

Further, in using a conventional rearview system for assistance of parking, as shown in a monitor screen 6 of the conventional rearview system shown in FIG. 19, a guide line 6b showing the width of the vehicle and a guide line 6c showing the distance from the rear of the vehicle are superimposed on a bumper image 6a at the rear end of the vehicle shot by a wide angle camera. The driver uses the bumper image 6a and the guide lines 6b, 6c superimposed thereon as auxiliary information to follow vehicle parking procedure.

In the aforementioned conventional rearview system, a scene such as that shown in FIG. 14, that is, when two parallel straight lines 10, 11, two drum-shaped objects 12, 13 arranged apart on the straight line 10, and a mark 14 drawn between the two drum-shaped objects 12, 13 on the straight line 10 are shot by a wide angle camera 2, a considerably curved image 10a, 11a and curved drum-shaped object images 12a, 13a and a mark image 14a on the curved image 10a are displayed, for example as shown in FIG. 15 or 16.

In this way, when an image shot by the wide angle camera 2 is displayed on the monitor screen without correction, the position and shape of the subject such as the drum-shaped objects 12, 13 and the straight lines 10, 11 are considerably distorted. The driver cannot understand the displayed image intuitively and without a sense of incongruity in all the areas of a monitor screen 7.

The plumb line of a three-dimensional object such as the drum-shaped objects 12, 13 does not coincide with the plumb line in the monitor screen 7, which is not intended to help intuitively understand the direction the three-dimensional object. For example, in order to simply display the position of a three-dimensional object, the inclination of the plumb line of the drum-shaped object 12, 13 shown in FIG. 15 is preferably used to indicate the bearing. This results in that the plumb line of a three-dimensional object does not coincide with the plumb line of the screen but is displayed at an angle.

In the example of FIG. 15, the drum-shaped objects 12, 13 are shown as if installed on the surface of a sphere. Displaying the plumb line of a three-dimensional object such as the drum-shaped objects 12, 13 so that the plumb line will coincide with the plumb line of the screen results in the camera bearing totally different from the intuitive bearing thus making it difficult to find the position of the three-dimensional object.

In the example shown in FIG. 16, the right angle direction gradually converges as both ends of the screen 7 is approached. Thus the positions of the drum-shaped objects 12, 13 are different from the real positions at the rear of a vehicle and the drives sees the straight lines 10, 11 as if they were curves 10a, 11a extending diagonally backward from the vehicle.

In case right and left images independent from each other are displayed on the same screen, setting the right/left screen shape allows intuitive understanding of the directions of the right and left cameras as well as display of three-dimensional objects in respective images without a sense of incongruity according to the conventional art shown in FIG. 17. The conventional art in FIG. 17, however, does not solve the problem of how to display in a single screen a wide field of view such and the shooting range of a wide angle camera.

In a monitor screen 6 of a conventional rearview system to assist parking shown in FIG. 19, cameras are mounted so that the bumper at both rear ends of the vehicle and the rear area thereof are shot. The conventional rearview system displays an image shot by a wide angle camera on the monitor screen 6 without correction. This considerably bends a bumper image 6a further than the real image. Similarly, a guide line showing the vehicle width of the vehicle or a guide line 6c showing the distance from the rear end of the vehicle are displayed in curves although they are actually straight lines. This complicates the relation between the vehicle and objects around the vehicle.

SUMMARY OF THE INVENTION

The object of the invention is to provide driving assistance display apparatus for displaying on a single screen an image from a wide angle camera so that the driver can understand the image intuitively and without a sense of incongruity.

A driving assistance display apparatus that attains the aforementioned object includes image processing means for splitting a monitor screen into a plurality of sub-screens in correspondence with each inner face of a polyhedron obtained when the inside of the polyhedron is shot, performing image processing on an image from a vehicle-mounted camera as well as splitting the processed image in correspondence with the sub-screen areas and displaying the split screens in the corresponding sub-screen areas.

This provides a screen configuration that displays an image in a direction corresponding to the orientation of each face, thereby representing to the driver an image allowing intuitive understanding of an image displayed in each sub-screen without sense of incongruity.

Preferably, in the driving assistance display apparatus, the split screens corresponding to some of the inner faces of the polyhedron are not displayed on the monitor screen. This conceals unnecessary images from the driver.

Preferably, in the driving assistance display apparatus, the sub-screen areas adjacent to each other are displayed apart on the monitor screen. Or, in the driving assistance display apparatus, the split images with different display magnification are displayed so as to scale the corresponding sub-screen areas to the display magnification. This represent a more easy-to-watch image to the driver.

Preferably, in the driving assistance display apparatus, the split images respectively displayed in the adjacent sub-screen areas are continuous at the adjacent section. Or, in the driving assistance display apparatus, the split images respectively displayed in the adjacent sub-screen areas represent a single image overlapped in the adjacent section. This allows easy understanding of the relation between sub-screens and understanding of an object traveling across sub-screens in easy correspondence.

Preferably, in the driving assistance display apparatus, the shot image of the vehicle width range of the vehicle is displayed in the sub-screen area to display the image of the lower area in the travel direction of the vehicle among the sub-screen areas and that the shot images outside the vehicle width range are displayed in adjacent sub-screen areas. This facilitates determination on whether an object in question is an object in the travel direction of the vehicle or an object that the vehicle will come in contact with or collide with while the vehicle is traveling.

DETAILED DESCRIPTION OF THE PREFERRED EMBODIMENT

An embodiment of the invention will be described referring to drawings.

(Embodiment 1)

The first embodiment of the invention will be described referring to FIGS. 2 through 5. Hardware configuration of driving assistance display apparatus of the invention is the same as the configuration shown in FIG. 18. A wide angle rearview camera 2 is mounted so as to shoot the rear of the vehicle 1. Lens distortion of an image shot by the wide angle camera 2 is eliminated by image synthesis/conversion unit (image processing means) 3 and the image is converted to an image shot from an arbitrary virtual viewpoint and displayed on a monitor 4.

Figure 2A:
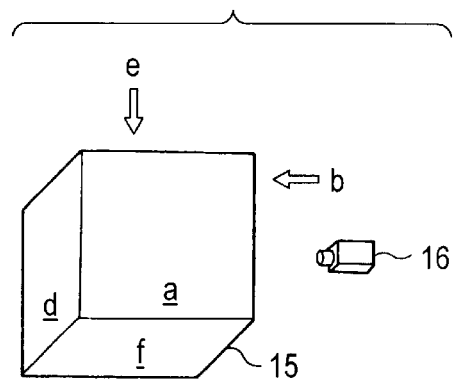
FIG. 2 explains a display screen split method for driving assistance display apparatus according to the first embodiment of the invention.
Figure 2B:
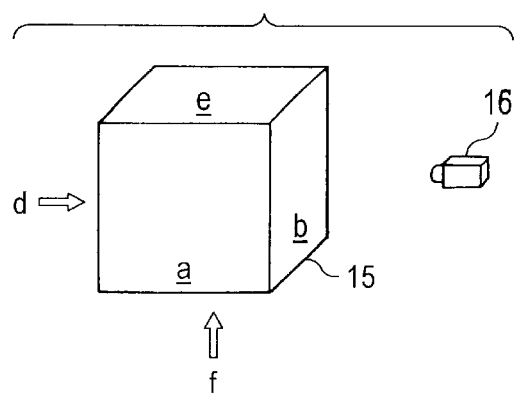

FIG. 2A shows a rectangular parallelepiped 15 seen from a diagonally lower rearward position. FIG. 2B shows the rectangular parallelepiped 15 seen from a diagonally upper forward position. The rectangular parallelepiped 15 is shot by a camera 16. The rectangular parallelepiped 15 is composed of six faces (the faces are referred to as face a, face b, face c, face d, face e, and face f).

Figure 3:
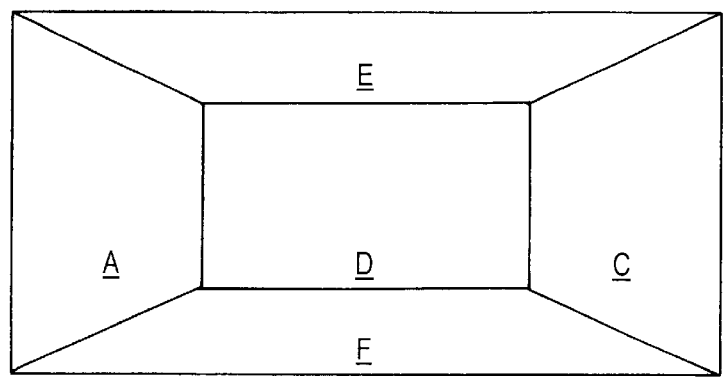
FIG. 3 explains a display screen split method for driving assistance display apparatus according to the first embodiment of the invention.

The camera 16 is opposed to face b. When the camera 16 shoots the rectangular parallelepiped 15 except the face b, an image shown in FIG. 3 is obtained. It is intuitively understood from the shapes of areas and relation between the areas that Area A in FIG. 3 indicates face a as a left side face of the rectangular parallelepiped 15, Area C indicates face c as a right side face, Area D indicates face d as a front face, Area E indicates face e as an top face, and Area F indicates face f as a bottom face, respectively.

A line is drawn at the boundary of areas to help recognize the shape of each area. An image of the left side face of the rectangular parallelepiped is affixed on Area A, an image of the front face is affixed on Area D, an image of the top face is affixed on Area E, and an image of the bottom face is affixed on Area F.

By doing this, the direction of an area intuitively understood from its shape coincides with the spatial orientation of an image displayed in the area. Thus it is possible to intuitively understand the spatial orientation of an image displayed in each area.

According to the embodiment, the monitor screen is split into five sub-screens A, B, C, D and E. An image of the same orientation of each face of the rectangular parallelepiped is split from a wide angle shot image and affixed to each sub-screen for display.

The display screen need not use all the faces. The screen may be composed for example of only three faces, Face A (left side face), Face C (right side face), and Face D (front face), as shown in a display screen 17 in FIG. 4. These faces need not be tangent to each other at a boundary. The faces can be separately arranged while the relative relation between the faces being maintained, as shown in the display screen 17 in FIG. 5.

Figure 4:
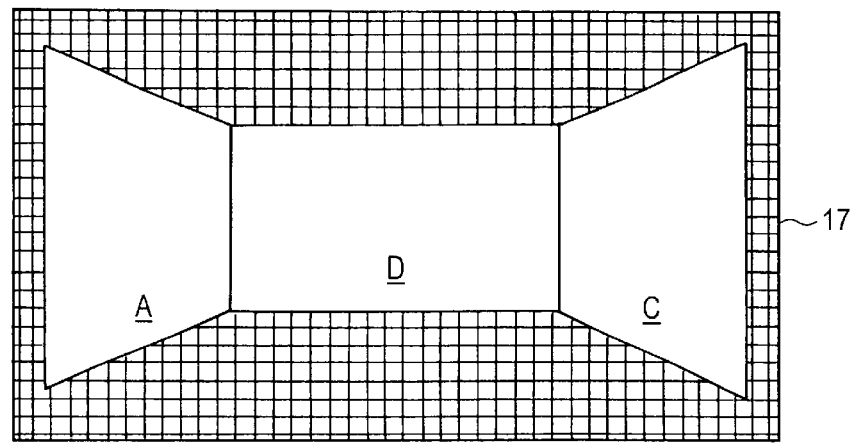
FIG. 4 shows an example of a display screen split method for driving assistance display apparatus according to the first embodiment of the invention.
Figure 5:
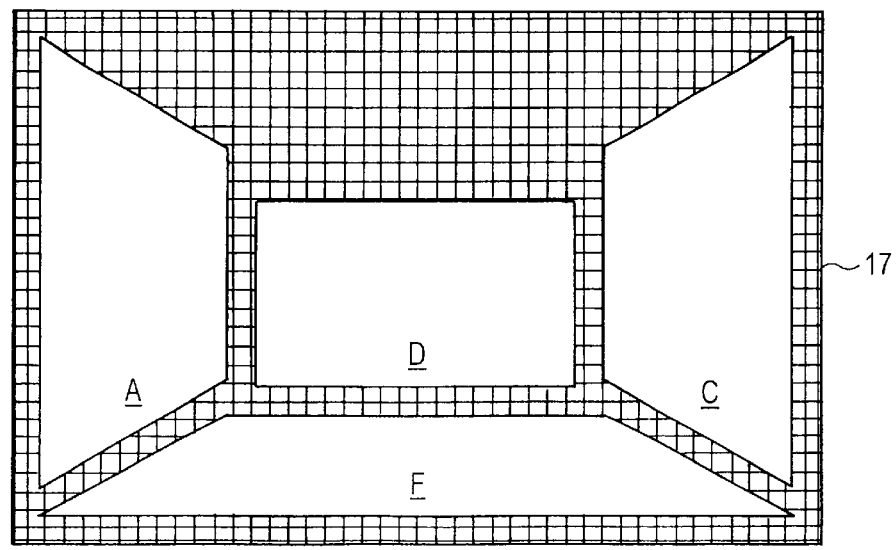
FIG. 5 shows another example of a display screen split method for driving assistance display apparatus according to the first embodiment of the invention.

In FIG. 5, the screen is composed of face A, Face C, Face D and face F (bottom face). Further, the sub-screen of each of Face A and Face C is enlarged than other sub-screens. In FIGS. 4 and 5, the shape of a sub-screen is the image area of each face itself. The shape of a sub-screen maybe arbitrarily modified as far as the relative relation between faces is intuitively understood, that is, as far as the direction of each face is intuitively understood, for example by rounding off corners or drawing boundary lines in curves.

(Embodiment 2)

Figure 6:
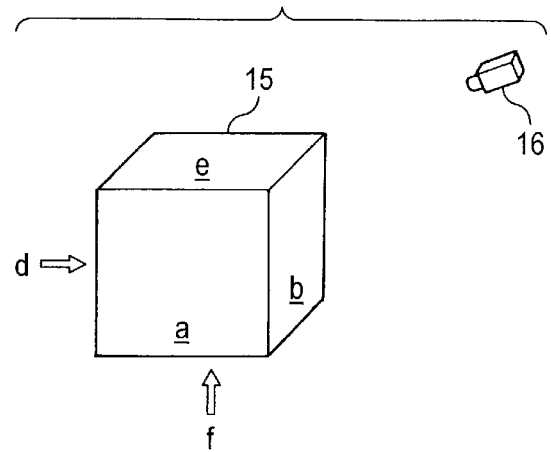
FIG. 6 explains a display screen split method for driving assistance display apparatus according to the second embodiment of the invention.

The second embodiment of the invention will be described referring to FIGS. 6 through 9. FIG. 6 shows the relation between the rectangular parallelepiped 15 composed of six faces, face a, face b, face c, face d, face e and face f. In FIG. 6, a camera 16 is arranged diagonally upward from the rectangular parallelepiped 15. A camera-shot image with face b and face b of the rectangular parallelepiped removed is as shown in the display screen 17 shown in FIG. 7.

Figure 7:
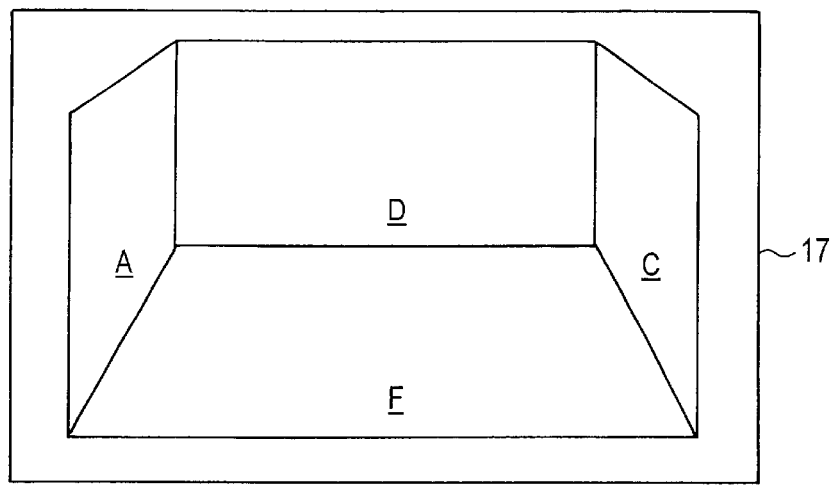
FIG. 7 explains a display screen split method for driving assistance display apparatus according to the second embodiment of the invention.

It is intuitively understood from the shapes of areas and relation among the areas that Area A in FIG. 7 indicates face a as a left side face of the rectangular parallelepiped 15, Area C indicates face c as a right side face, Area D indicates face d as a front face, and Area F indicates face f as a bottom face, respectively.

Figure 8:
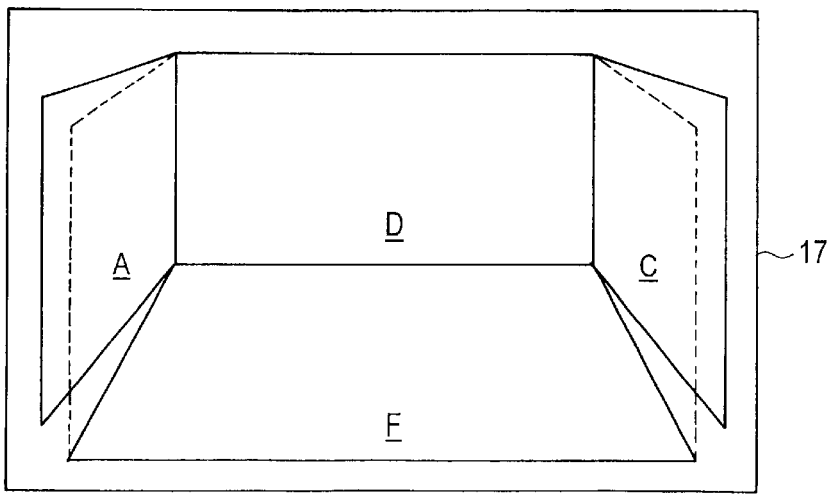
FIG. 8 shows an example of a display screen split method for driving assistance display apparatus according to the second embodiment of the invention.

In FIG. 6, face b and face e of the rectangular parallelepiped 15 are removed. Face a and face f as well as face c and face f are split at boundaries and face a and face c is respectively oriented in the outer direction of the rectangular parallelepiped 15, then the image is shot by the camera 16. The image in FIG. 8 is displayed on the display screen 17. In FIG. 8, same as FIG. 7, it is intuitively understood from the shapes of areas and relation between the areas that Area A indicates face a as a left side face, Area C face indicates c as a right side face, Area D indicates face d as a front face, and Area F indicates face f as a bottom face, respectively.

Figure 9:
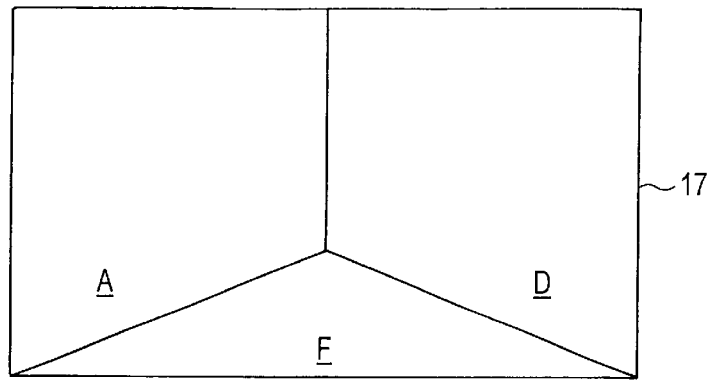
FIG. 9 shows another example of a display screen split method for driving assistance display apparatus according to the second embodiment of the invention.

The camera 16 is oriented in the direction of an apex where face a, face d and face f of the rectangular parallelepiped 15 crosses each other, and an image of a rectangular parallelepiped 16 with face b, face c and face e removed is shot, and displayed on the display screen 17 as shown in FIG. 9. In FIG. 9 also, it is intuitively understood from the shapes of areas and relation among the areas that Area A indicates face a as a left side face, Area D indicates face d as a front face, and Area F indicates face f as a bottom face, respectively.

Thus, by affixing images in the respective directions on sub-screens corresponding to areas A, C, D and F in FIGS. 7, 8 and 9, it is possible to let the driver grasp a three-dimensional camera-shot image.

(Embodiment 3)

Figure 10:
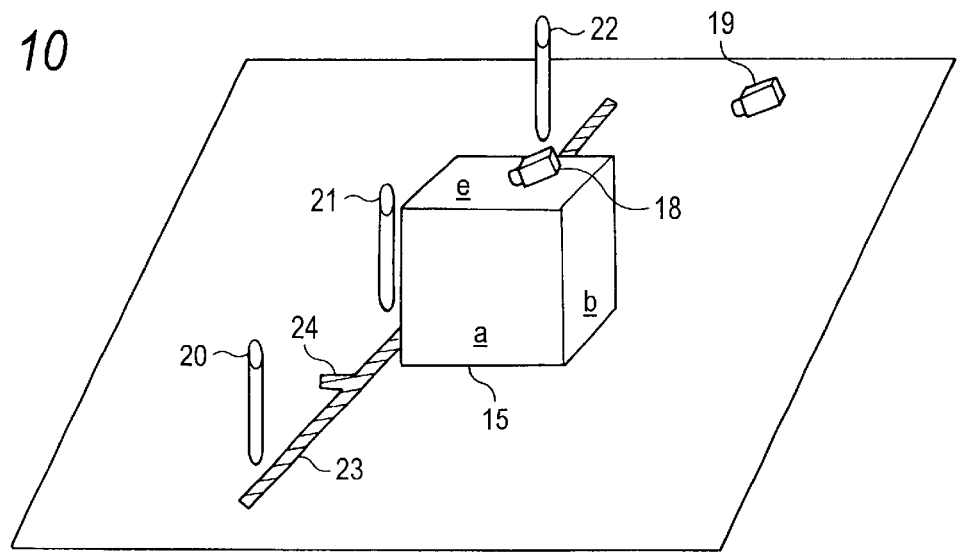
FIG. 10 explains a display screen split method for driving assistance display apparatus according to the third embodiment of the invention.

The third embodiment of the invention will be described referring to FIGS. 10 through 13 and FIG. 1. In FIG. 10, according to this embodiment, a virtual (input) camera 18 is arranged in the center of the rectangular parallelepiped 15 composed of six faces, face a, face b, face c, face d, face e and face f. A virtual (output) camera 19 is arranged diagonally upward apart from the rectangular parallelepiped 15.

Subjects shot by the virtual camera 18 are three drum-shaped objects 20, 21, 22 erected on the road surface, a straight line 23 and a mark 24 drawn on the road surface in this example. When the virtual camera 18 is used to shoot the subjects through face a and face c as left and right side faces of the rectangular parallelepiped 15 and face d as a front face, three continuous images shown in FIG. 11 can be shot for faces a, d and c. Note that face a, face d and face c are displayed in an open shape as a single plane in FIG. 11. In each face are displayed drum-shaped object images 20a, 21a, 22a, a straight line image 23a and a mark image 24a.

Figure 11:
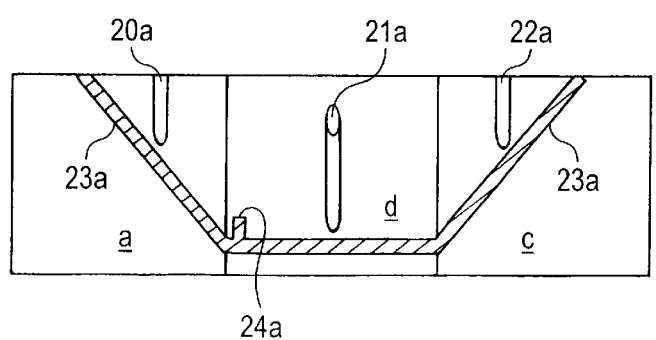
FIG. 11 explains a display screen split method for driving assistance display apparatus according to the third embodiment of the invention.

Next, an image of face a, an image of face d, and an image of face c shown in FIG. 11 are affixed to the inner surface of face a, face d, face c, then a virtual camera 19 is used to shoot the image. The image shot by the virtual camera 19 is shown in FIG. 12.

Figure 12:
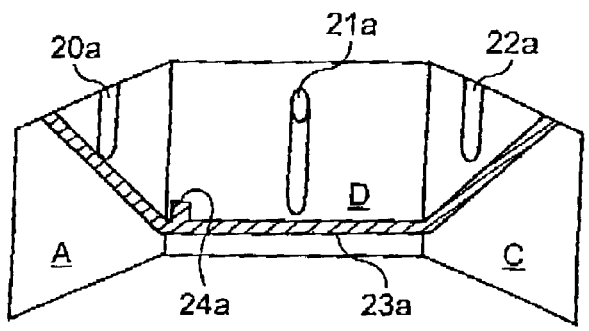
FIG. 12 shows an example of a display screen split method for driving assistance display apparatus according to the third embodiment of the invention.

In FIG. 12, Area A corresponds to face a, Area C to face c, and Area D to face d, respectively. It is intuitively understood from the shapes of areas that Area A displays an image in the left side direction, Area C displays an image in the right side direction, and Area D displays an image in the front direction, respectively.

Images are continuous at boundaries between faces in FIG. 12. Thus the relation between screens is clear. Even in case an object image is present across faces, it is easy to grasp the entire image. By displaying images so that they continue at boundaries, an object present across faces or traveling across faces can be easily recognized as a single object.

FIG. 12 shows an example where images of face a, face d and face c are shot by the virtual (input) camera 18 so that the resulting images displayed are continuous at boundaries between faces. It is possible to shoot images so that face a and face d as well as face d and face c have an overlap area respectively.

Figure 13:
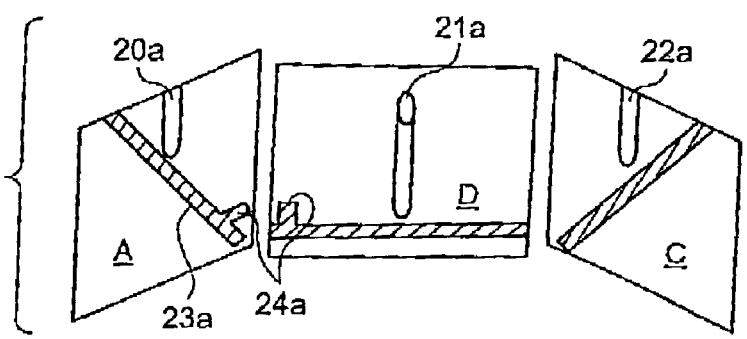
FIG. 13 shows another example of a display screen split method for driving assistance display apparatus according to the third embodiment of the invention.

FIG. 13 shows a configuration where Area A, Area C and Area D are split from each other and each face has an overlap area. In the example of FIG. 13, a mark image 24a is in a corner of Area A. The mark image 24a is also displayed in a corner of Area D adjacent to Area A. In this way, from the shapes of areas, the direction indicated by each area is intuitively understood even when the areas are split at boundaries. Areas have overlap areas thus easily understanding correspondence between areas.

In this way, providing faces with overlap areas allows easy correspondence even when the magnification of each face differs. Even when part of an object is concealed at a boundary of a face, at least that part is shown for another face. This allows easy correspondence and recognition.

Figure 1:
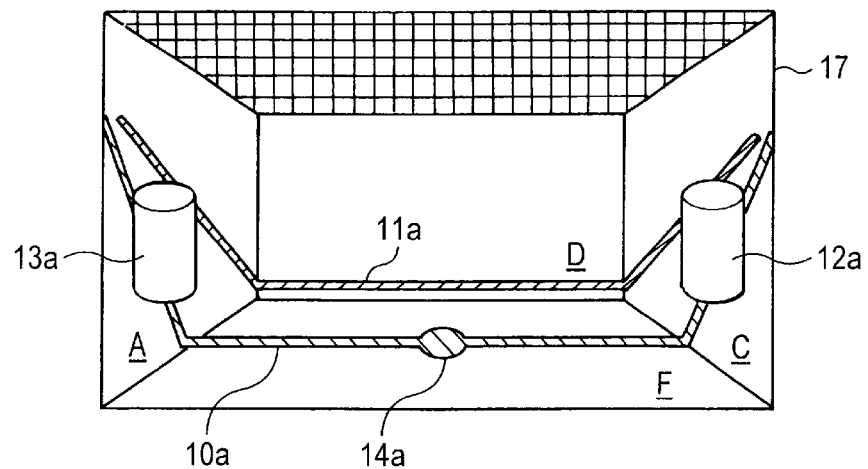
FIG. 1 is a schematic view of driving assistance display apparatus according to an embodiment of the invention.
Figure 14:
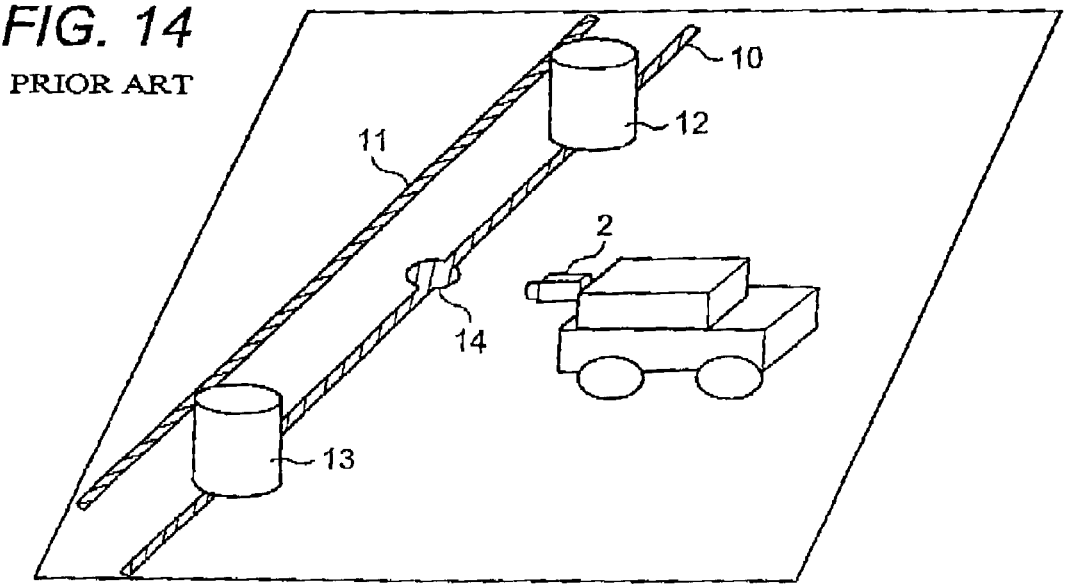
FIG. 14 explains the subjects of a vehicle-mounted camera comparing the screen display by driving assistance display apparatus according to an embodiment of the invention and the screen display according to a conventional driving assistance display apparatus.
Figure 15:
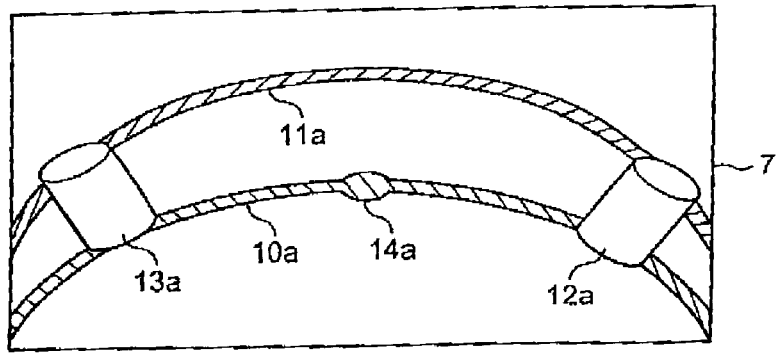
FIG. 15 shows an example of conventional driving assistance display apparatus.
Figure 16:
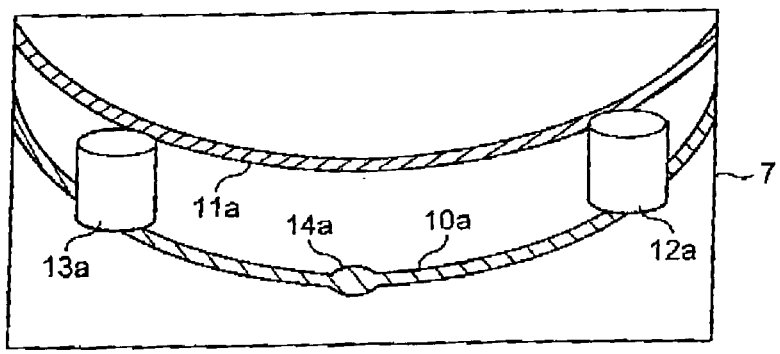
FIG. 16 shows an example of conventional driving assistance display apparatus.
Figure 17:
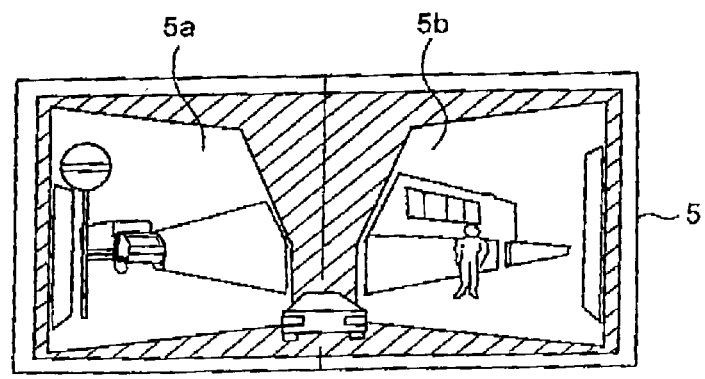
FIG. 17 shows an example of conventional driving assistance display apparatus.

FIG. 1 shows an example where subjects in FIG. 14 shot by the virtual (input) camera 18 so that the resulting image will be continuous at boundaries between faces and the images are affixed to faces of the rectangular parallelepiped, same as the embodiment in FIG. 12. In FIG. 1, a straight line is shown as a straight line image and an object erected vertically is displayed as an object image erected vertically. The image in each sub-screen is displayed as a distortion-free two-dimensional image. All this provides an intuitively easy-to-watch image and helps grasp the relation between the vehicle and obstacles in a three-dimensional image.

An image of a direction of each face need not an image actually shot but may be an image obtained by setting a virtual viewpoint opposed to a specific face and converting a real image as if shot by a camera arranged at this virtual viewpoint. The virtual viewpoint need not be opposed to a specific face. For example, a single virtual viewpoint and a single wide angle camera may be set and an image in the orientation of a specific face seen from the virtual viewpoint may be cut away from the wide angle image obtained.

(Embodiment 4)

The fourth embodiment of the invention will be described. This embodiment, in displaying the rearward and forward areas of the vehicle, displays an image of the width of the vehicle or slightly wider in the display area corresponding to the bottom face, so that whether an arbitrary object is on the straight travel path of the vehicle is easily determined. The driver can thus intuitively grasp the position of the arbitrary object. The fourth embodiment will be further described referring to FIG. 5 and FIG. 18.

Figure 18:
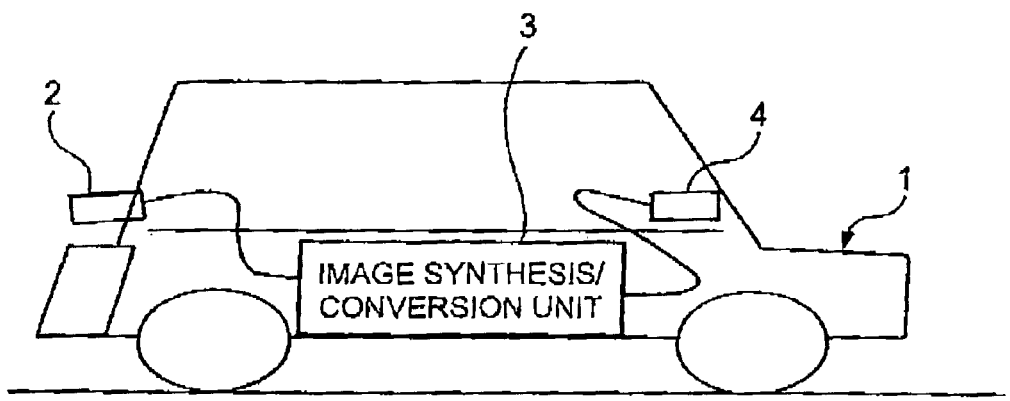
FIG. 18 is a block diagram of conventional driving assistance display apparatus and driving assistance display apparatus according to an embodiment of the invention.
Figure 19:
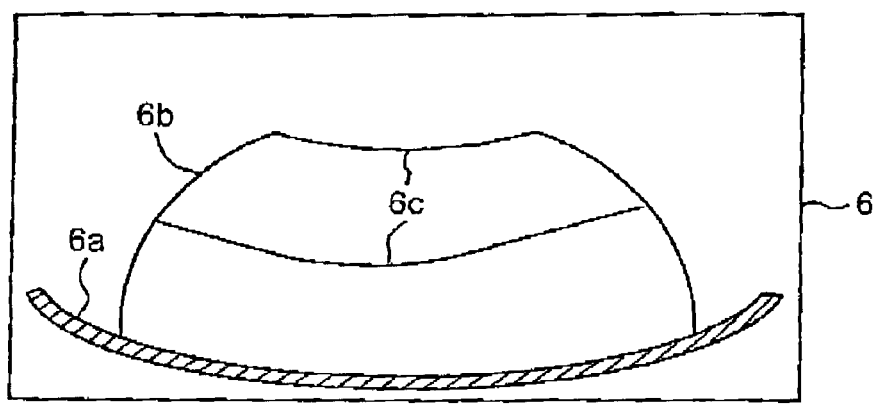
FIG. 19 shows an example of conventional driving assistance display apparatus.

As shown in FIG. 18, a camera 2 is mounted so as to shoot the rearward area of the vehicle. While only a single camera 2 is shown in FIG. 18, a plurality of cameras may be mounted. An image synthesis/conversion unit 3 uses images shot by these cameras as input to generate an output image shown in FIG. 5. In FIG. 5, an image in the direction of the bottom face at the rear of the vehicle is displayed on Face F. An image in the left side face direction at the rear of the vehicle is displayed on Face A, an image in the right side face direction at the rear of the vehicle is displayed on Face C, and an image in the rear direction of the vehicle is displayed on Face D.

The width of face F or displayed image is adjusted so that the width displayed by Face F is equal to or slightly greater than the width of the vehicle. In this way, only an area where the vehicle passes when the vehicle is backed straight is displayed on Face F. It is understood at a glance that what is on face F is positioned in the rear of the vehicle and what is on Face A is in the left rear of the vehicle.

According to the fourth embodiment of the invention, only an image of the vehicle width range of the vehicle or a slightly wider range is displayed on the sub-screen displaying the bottom face, and not object images out side the width range of the vehicle. It is easy to determine whether an object in question is an object in the travel direction of the vehicle or an object that the vehicle will come in contact with or collide with while the vehicle is traveling.

According to the invention, it is possible to grasp easily and in a three-dimensional basis an image shot by a vehicle-mounted camera and display the image as one that helps intuitively determine the relation between the vehicle and obstacles.

What is claimed is:

1. A driving assistance display apparatus comprising image processing unit for splitting a monitor screen into a plurality of sub-screens in correspondence with each inner face of a polyhedron obtained when the inside of the polyhedron is shot, performing image processing on an image from a vehicle-mounted camera as well as splitting the processed image in correspondence with the sub-screen areas, and displaying the split images in the corresponding sub-screen areas.

2. The driving assistance display apparatus as claimed in claim 1, wherein the split at least one of images corresponding to at least one of the inner faces of the polyhedron is not displayed on the monitor screen.

3. The driving assistance display apparatus as claimed in claim 1, wherein the sub-screen areas adjacent to each other are displayed apart on the monitor screen.

4. The driving assistance display apparatus as claimed in claim 1, wherein the split images with different display magnification are displayed so as to scale the corresponding sub-screen areas to the display magnification.

5. The driving assistance display apparatus as claimed in claim 1, wherein the split images respectively displayed in the adjacent sub-screen areas are continuous at the adjacent section.

6. The driving assistance display apparatus as claimed in claim 1, wherein the split images respectively displayed in the adjacent sub-screen areas represent a single image overlapped in the adjacent section.

7. The riving assistance display apparatus as claimed in claim 1, wherein the shot image of the vehicle width range of the vehicle is displayed in the sub-screen area to display the image of the lower area in the travel direction of the vehicle among the sub-screen areas, and the shot images outside the vehicle width range are displayed in adjacent sub-screen areas.

* * * * *

UNITED STATES PATENT AND TRADEMARK OFFICE
CERTIFICATE OF CORRECTION

PATENT NO. : 6,801,127 B2
DATED : October 5, 2004
INVENTOR(S) : Kazufumi Mizusawa et al.

It is certified that error appears in the above-identified patent and that said Letters Patent is hereby corrected as shown below:

Title page,
Item [56], References Cited, FOREIGN PATENT DOCUMENTS, after
"WO   WO 00/64175   10/2000   ............ G03B-15-00" please insert
-- EP   1 158 473 A2   11/2001 --.
OTHER PUBLICATIONS, please delete the second occurrence of "Patent Abstracts of Japan, "Surrounding Monitoring Device for Vehicle", Publication No. 11338074, Publication Date: Dec. 10, 1999, 1 page."

Signed and Sealed this

Fourth Day of January, 2005

JON W. DUDAS
*Director of the United States Patent and Trademark Office*